(12) United States Patent
Raybaud et al.

(10) Patent No.: US 7,547,432 B2
(45) Date of Patent: Jun. 16, 2009

(54) PROCESS FOR THE STORAGE OF HYDROGEN USING A SYSTEM THAT STRIKES A BALANCE BETWEEN AN ALLOY OF MAGNESIUM AND PALLADIUM AND THE CORRESPONDING HYDRIDE

(75) Inventors: Pascal Raybaud, Rueil Malmaison (FR); François Ropital, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 444 days.

(21) Appl. No.: 11/347,577

(22) Filed: Feb. 6, 2006

(65) Prior Publication Data
US 2006/0191607 A1  Aug. 31, 2006

(30) Foreign Application Priority Data
Feb. 7, 2005  (FR) .................... 05 01229

(51) Int. Cl.
*C01B 6/04* (2006.01)
*F17C 11/00* (2006.01)
(52) U.S. Cl. .................... 423/648.1; 420/900
(58) Field of Classification Search .................... 96/108; 95/116; 206/0.7; 420/900, 402, 463; 423/248, 423/648.1, 658.2; 429/218.2
See application file for complete search history.

(56) References Cited

U.S. PATENT DOCUMENTS

| | | | |
|---|---|---|---|
| 4,828,606 A * | 5/1989 | Bogdanovic et al. | .......... 75/723 |
| 4,923,770 A | 5/1990 | Grasselli et al. | |
| 5,199,972 A * | 4/1993 | Bogdanovic | .................. 75/255 |
| 2002/0197181 A1 | 12/2002 | Osawa et al. | |

FOREIGN PATENT DOCUMENTS

| EP | 0196190 | 10/1986 |
|---|---|---|
| WO | WO 9920422 | 4/1999 |

* cited by examiner

*Primary Examiner*—Frank M Lawrence
(74) *Attorney, Agent, or Firm*—Millen, White, Zelano & Branigan, P.C.

(57) ABSTRACT

A process for the reversible storage of hydrogen, comprising bringing into contact an alloy of magnesium and palladium with the gaseous hydrogen leading to the formation of hydride or corresponding hydrides, comprises the use of a balanced system corresponding
to the formula:

$$Mg_xPd \Leftrightarrow Mg_xPdH_n$$

in which atomic ratio x takes on a value of 3 to 6, and n is the number of hydrogen atoms corresponding to the stoichiometry of the hydride or hydrides formed
or to the formula:

$$Mg_xPd \Leftrightarrow Mg_2PdH_4 + Mg_{x-2}H_n$$

in which the atomic ratio x takes on a value of 7 to 9, and n is the number of hydrogen atoms corresponding to the stoichiometry of the hydride or hydrides formed.

19 Claims, 4 Drawing Sheets

PROCESS FOR THE STORAGE OF HYDROGEN USING A SYSTEM THAT STRIKES A BALANCE BETWEEN AN ALLOY OF MAGNESIUM AND PALLADIUM AND THE CORRESPONDING HYDRIDE

FIELD OF THE INVENTION

This invention relates to a process for reversible storage of the hydrogen using new crystalline materials that are potentially advantageous for the storage of hydrogen.

PRIOR ART

Within the scope of research of new energy systems, the development of processes for storage and transport of hydrogen seems to be very important. Magnesium is an element that is known for its good properties of absorbing hydrogen and in the presence of hydrogen forms a stable hydride that makes the desorption of the hydrogen difficult.

Patent Application US 2002/0197181 describes the use for the storage of the hydrogen of alloys with a magnesium base comprising metallic magnesium and an intermetallic compound $Mg_xM_y$, whereby the total magnesium content in the alloy is at least 60% by weight.

Patent Application WO 99/20422 describes the production of nanocomposites of nanocrystalline structure used for storing hydrogen, prepared from a magnesium hydride or an alloy with a magnesium base and another element that is known for absorbing hydrogen but not forming an alloy with magnesium.

Patent Application EP 0 196 190 A describes electrodes that are made of an amorphous metal alloy with at least 50% for storing hydrogen.

OBJECT OF THE INVENTION

This invention relates to a process for reversible storage of hydrogen using new crystalline materials that are potentially advantageous for the storage of hydrogen (theoretically more than 5% by mass) under the following conditions, defined by the pressure-temperature isothermal plateau:

270 K<T<370K, and

1<P<10 atm (or about 0.1 MPa<P<about 10 MPa).

These new materials comprise a balanced system that is formed between an alloy of magnesium and palladium and the corresponding hydride; they are more particularly of the type:

$$Mg_xPd \Leftrightarrow Mg_xPdH_n$$

where x is the atomic ratio Mg/Pd and n is the number of stoichiometric hydrogen atoms of the hydride or formed hydrides. The atomic ratio x can take on a value of 3 to 6. To represent $Mg_xPdH_n$, the $Mg_2PdH_4$ structure in combination with $MgH_2$ is considered more particularly.

When the atomic ratio takes on a value of 7 to 9, the hydride at equilibrium with the alloy of formula $Mg_xPd$ corresponds more particularly to the $Mg_2PdH_4$ structure.

The invention also relates to a new structure that corresponds to the formula $Mg_2PdH_4$.

DETAILED DESCRIPTION OF THE INVENTION

In the storage process according to the invention, the alloys of magnesium and palladium are brought into contact with gaseous hydrogen and thus lead to the formation of (a) corresponding hydride compound(s) (hydrogen absorption). By slightly increasing the temperature or slightly reducing the hydrogen pressure, the formed hydride restores the hydrogen (desorption). It is therefore a reversible storage process.

By forming the $Mg_xPd$ alloys at equilibrium with the hydride (or the hydrides) of overall stoichiometry $Mg_xPdH_n$ on the isothermal plateau, the addition of the palladium element makes it possible to improve significantly the thermodynamic properties of the simple magnesium hydride.

The structures of certain $Mg_xPd$ alloys are inventoried in the ICSD and CRYSMET databases, whereby the $Mg_2PdH_4$ structure that is not inventoried is resolved by the method of calculation described below.

The ICSD (Inorganic Crystal Structure Database) base is the property of the "Fachinformationszentrum Karlsruhe [Technical Information Center of Karlsruhe] (FIZ)" in Germany and the "National Institute of Standards and Technology (NIST)" in the U.S.A. (see also http://www.icsd.ill.fr//).

The CRYSMET base belongs to and is maintained by "Toth Information Systems," Ottawa, and le Conseil national de recherches [National Research Council] of Canada.

(ICSD and CRYSMET can be accessed within the MedeA interface marketed by Materials Design S.a.r.l., Le Mans (France)).

Many useful properties of a solid material can be derived directly from determining its chemical cohesion energy. This cohesion energy is intrinsically based on the chemical composition, the local atomic structure of the material, its electronic properties, and all the physical properties that are derived therefrom. Quantum physics and more specifically the density functional theory (whose abbreviation DFT is obtained from the English "Density Functional Theory") provide a reliable base for the quantitative prediction of structural, electronic and thermodynamic properties of an atomic, molecular or crystalline structure before any attempt at synthesis of the laboratory material (see: W. Kohn, L. J. Sham, Phys. Rev. A 140, 1133 (1965)). In particular, the formalism of the DFT, as it is implemented in many current quantum software applications, such as:

the "Vienna Ab initio Simulation Package" (VASP) (see: G. Kresse, J. Haffier, Phys. Rev. B 48 (1993) 13115; G. Kresse, J. Furthmüler, Phys. Rev. B 6 (1996) 15; as well as the address URL: http://www.cms.mpi.univie.ac.at/vasp/; references [1]);

"CASTEP" (see: http://www.tcm.phy.cam.ac.uk/castep/), and

"Gaussian" (see: httt://www.gaussian.com), has as a central object the determination of the electronic wave function of a material that is simulated by an approximate solution to the famous Schrödinger equation. Access to the wave function makes possible the development of a predictive and quantitative methodology of the chemical bond in an atomic, molecular or crystalline structure.

In the search for new materials for the storage of hydrogen, the experimenters need to rely on the knowledge and a methodology of the chemistry of the solid. On the basis of thermodynamic concepts such as the formation enthalpy, the relative stabilities of the structures of materials can be quantified based on temperature and pressure conditions. The modem techniques of quantum calculation such as the DFT offer the advantage of relying on a minimal knowledge of empirical data for determining these same thermodynamic properties. Thanks to the knowledge of basic constants of physics, these techniques, thus often called "ab initio," therefore make it possible to predict the energy stability and the physico-chemical properties of a crystalline structure defined by its composition and its crystallographic mesh, independently of any experimental approach. Moreover, these techniques make it possible to eliminate experimental uncertainties on the structure of a material.

The use of intermetallic hydrides as materials for storing hydrogen is based on the following chemical balance:

$$\frac{2}{n}M + H_2 \rightarrow \frac{2}{n}MH_n \quad (1)$$

where M represents the stable metallic phase being transformed into the stoichiometric hydride phase $MH_n$.

This hydride phase has a theoretical mass storage capacity that is equal to $nMH/(nMH+MM) \times 100\%$, where MH is the molar mass of atomic hydrogen and MM is that of metal.

The thermodynamic characteristics of transformation (1) are described by a pressure-temperature isotherm. When the two hydride and metal phases co-exist, the isotherm has a plateau. Temperature T and equilibrium pressure $P_{eq}$ of the plateau are determined by the Van't Hoff equation:

$$\frac{2}{n}\ln\left(\frac{P_{eq}}{P^0}\right) = \frac{\Delta H_{hyd}}{RT} - \frac{\Delta S_{hyd}}{R} \quad (2)$$

where:

$\Delta H_{hyd}$ (or $\Delta S_{hyd}$) represents the enthalpy variation (or the entropy variation) of transformation (1);

$R=8.314510$ J.mol$^{-1}$.K$^{-1}$ is the molar constant of the ideal gases, and $P^0=1$ bar is the standard pressure (or 0.1 MPa).

This approach can be generalized for hydrides of metal alloys, $AB_x$, in the following way:

$$\frac{2}{n}AB_x + H_2 \rightarrow \frac{2}{n}AB_xH_n \quad (3)$$

where A and B are two metal elements and x is the atomic ratio B/A in the alloy.

It is commonly recognized that the primary contribution according to the terms of entropic variation $\Delta S_{hyd}$ is the loss of entropy of the hydrogen molecule that passes from the gas phase in an adsorbed state into the solid state of the final hydride. The value of $\Delta S_{hyd}$ is known for being close to 130 J. K$^{-1}$.mol$^{-1}$ of $H_2$, regardless of the hydride (see: "Hydrogen-Storage Materials for Mobile Applications," L. Schlapbach, A. Züttel, Nature 414 (2001) 353-358, reference [2]; and "Hydrogen Storage Properties of Mg Ultrafine Particles Prepared by Hydrogen Plasma-Metal Reaction," H. Shao, Y. Wang, H. Xu, X. Li, Materials Science Engineering B 110 (2004) 221-226, reference [3]). Below, we retained this value. According to equation (2), also valid for reaction (3), the logarithm of the pressure at equilibrium, $P_{eq}$, varies linearly with the opposite of temperature T. The slope of the linear relationship is determined by $\Delta H_{hyd}$. In the following examples, we will show, thanks to the Van't Hoff diagrams, the variations of the logarithm of $P_{eq}$ based on 1/T (more specifically 1000/T for reasons of providing units). Such diagrams make it possible to identify potentially advantageous materials for storing hydrogen in a targeted range of $P_{eq}$ and T.

Consequently, the prediction (by a reliable theoretical approach) is of major interest for the knowledge of temperature and pressure conditions in which the metal or alloy can be transformed into hydride. As $\Delta H_{hyd}$ is in general exothermic (for the stable hydrides), the slope is negative. The value of $\Delta H_{hyd}$ closely depends on the stability of the hydride relative to the metallic phase or to the alloy: the more thermodynamically stable the hydride, the more reaction (1) or (3) is exothermic.

The formation enthalpy of the hydride, $\Delta H_{hyd}$, can be expressed based on the variation of internal energy during hydrogenation, $\Delta E_{hyd}$:

$$\Delta E_{hyd} = E_{AB_xH_n} - E_{AB_x} - E_{H_2} \quad (4)$$

where E represents the internal energy of the hydride phases, metal and the hydrogen molecule in gaseous phase. The internal energy of the material is linked to interactions between the atomic centers that constitute the material and the electrons. This energy is also often called electronic energy and is directly connected to the cohesion energy of the material. The expression of $\Delta H_{hyd}$ based on $\Delta E_{hyd}$ is as follows:

$$\Delta H_{hyd} = \Delta E_{hyd} + P\Delta V + \Delta ZPE + T\Delta c_p \quad (5)$$

where $\Delta c_p$ represents the calorific capacity variation between the hydride phase and the metal phase, $\Delta ZPE$ is the energy variation at the zero point between the hydride phase and the metal phase, and $\Delta V$ is the variation of molar volume between the hydride phase and the metal phase.

The modem techniques for quantum simulation make it possible to calculate systematically the values of $E_{AB_xH_n}$, $E_{AB_x}$ and $E_{H_2}$ and therefore to derive therefrom the value of $\Delta E_{hyd}$. For a given crystalline phase (known or unknown in an experimental way), the initial crystallographic structure is determined by the space group, the parameters of the primitive cell, and the atomic positions in the mesh of the primitive cell. For existing structures, the crystallographic databases, such as ICSD and CRYSMET, provide this information.

For the new structures (unknown or not totally resolved experimentally), the same standard description will be adopted in this invention. We will also add the simulation of the X-ray diffraction spectrum (DRX), commonly used experimentally for characterizing the observed structures.

For any structure (known or new), the process of rigorous simulation is adopted so as to determine the so-called basic state of the structure, i.e., the stable state of the structure. In this basic state, the values of $E_{AB_xH_n}$, $E_{AB_x}$, $E_{H_2}$ and $\Delta E_{hyd}$ are calculated. This process makes it possible in particular to determine the electronic wave function of the system by optimizing the crystalline structure for the hydride and metal solids and the hydrogen molecule, thanks to modern quantum simulation techniques at the DFT level (with a functional of the GCA, "Generalized Gradient Approximation," type), accessible in software such as VASP (see references [1] above). For this purpose, the following criteria are imposed during the calculation:

- the criterion of convergence of the electronic energy should be set at 0.01 kJ/mol of primitive cell,
- the criterion of convergence of the atomic positions and that of the volume of the primitive cell of the solid should lead to an energy precision of 0.1 kJ per mol of primitive cell,
- the grid of points-k used to describe the Brillouin zone should be large enough to ensure a fluctuation of the electronic energy that is weaker than 0.01 kJ per mol of cell,
- the size of the plane-wave base that is used or the precision of the base that is used should ensure a convergence of the electronic energy of more than 0.1 kJ per mol of primitive cell.

For the applications of storage of on-board hydrogen, a temperature at an equilibrium close to 300 K (1000/T #3.3 K$^{-1}$) is generally sought for a pressure that is close to 1 atm (about 0.1 MPa). Due to equation (2), this corresponds to a value of $\Delta H_{hyd}$ that is close to −39 kJ per mol of hydrogen. For this invention, and because of the precision of the simulation approach defined above, we will designate materials that are potentially advantageous for storing hydrogen, all the materials whose isothermal plateau verifies the following conditions:

$$270 < T < 370 K \text{ (or } 2.7 < 100/T < 3.7 \text{ K}^{-1})$$

and $$1 < P_{eq} < 10 \text{ atm (or about } 0.1 \text{ MPa} < P_{eq} < \text{about } 10 \text{ MPa)}. \quad (6)$$

The target window that materializes this domain will be shown in all the Van't Hoff diagrams in the following examples.

According to the invention, the alloy can also comprise, in a proportion of less than 5% by weight, at least the element N or a light transition metal of groups 3 to 12 of the periodic table selected from among, for example, Sc, Ti, V, Cr, Mn, Fe, Co, Ni, Cu and Zn.

The alloy of magnesium and palladium of the invention can come in solid form or in dispersed form, obtained by, for example, grinding.

The process is applied to, for example, the storage of on-board, stationary or portable hydrogen.

Figure 4:
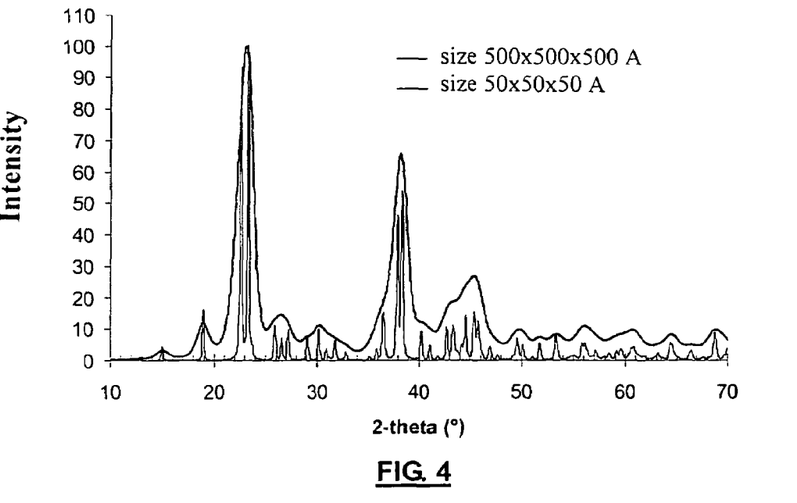
FIG. 4 is the X-ray diffraction spectrum of the crystalline structure $Mg_2PdH_4$.

The invention also relates to a new structure that corresponds to formula $Mg_2PdH_n$ and more particularly a new structure that corresponds to formula $Mg_2PdH_4$. The definition of the structure for $Mg_2PdH_4$ is provided in Table 6 and its X-diffraction spectrum is provided in FIG. 4.

EXAMPLES

Among the following examples, Examples 1 and 2 are provided by way of comparison, and Examples 3 and 4 illustrate the invention.

Example 1

(For Comparison): Known Case of Simple Hydrides

Figure 1:
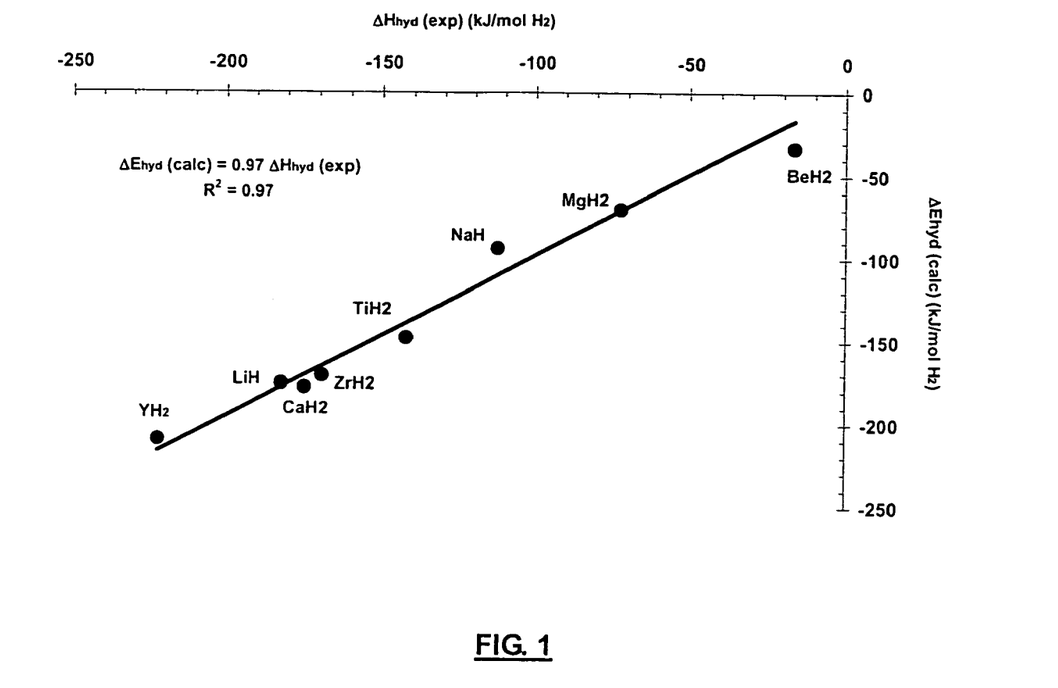
FIG. 1 indicates the calculated values of $\Delta E_{hyd}$ and the experimental values $\Delta H_{hyd}$ of the literature.

The diagram of FIG. 1 plots the values of $\Delta E_{hyd}$ that are calculated according to the process that is described above and the experimental values $\Delta H_{hyd}$ of the literature (see: "CRC Handbook of Chemistry and Physics," 76$^{th}$ Edition 1995-1996, David R. Lide Editor-in-Chief, CRC Press).

The crystallographic structures that are used are those of hydride and metal phases that are stable under conditions that are close to those set forth above in (6). They are recorded in Table 1.

TABLE 1

Simulated Structural Properties and Mass Capacity of Simple Hydrides.

| Hydride | Crystallographic Reference | Space Group | % by Mass | Balance Equation |
|---------|---------------------------|-------------|-----------|------------------|
| LiH | ICSD.61751 | FM3-M | 22.37 | $2Li + H_2 \rightarrow 2LiH$ |
| NaH | ICSD.33670 | FM3-M | 8.00 | $2Na + H_2 \rightarrow 2NaH$ |
| BeH$_2$ | ICSD.84231 | IBAM | 18.17 | $Be + H_2 \rightarrow BeH_2$ |
| MgH$_2$ | ICSD.26624 | P42/MNM | 7.60 | $Mg + H_2 \rightarrow MgH_2$ |
| CaH$_2$ | ICSD.23870 | PNMA | 4.75 | $Ca + H_2 \rightarrow CaH_2$ |
| YH$_2$ | CRYSMET.36093 | Fm-3m | 2.20 | $Y + H_2 \rightarrow YH_2$ |
| TiH$_2$ | CRYSMET.38081 | Fm-3m | 4.01 | $Ti + H_2 \rightarrow TiH_2$ |
| ZrH$_2$ | CRYSMET.39242 | I4/mmm | 2.15 | $Zr + H_2 \rightarrow ZrH_2$ |

The result of FIG. 1 shows that there is a linear relationship between the two basic values—experimental $\Delta_{hyd}$ and calculated $\Delta_{hyd}$—on a broad range of representative hydrides. These examples also show that the calculated value $\Delta E_{hyd}$ is a good thermodynamic descriptor for predicting the thermodynamic properties of materials for the purpose of storing hydrogen. The final precision on the energy is on the order of 3 to 5%, which is in agreement with the method of calculation used and the process described above.

Figure 2:
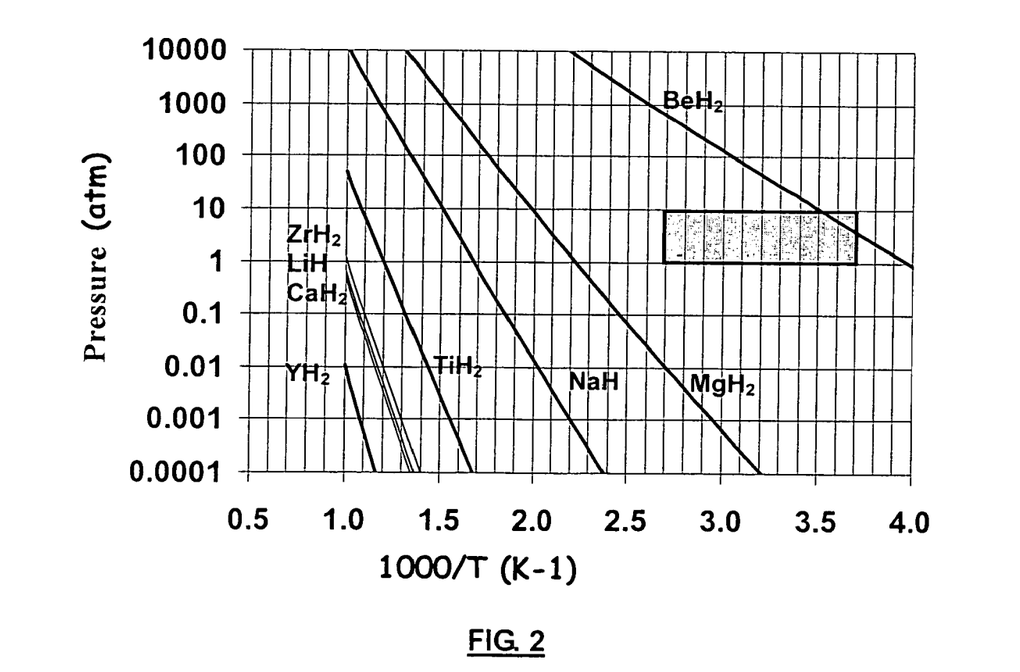
FIG. 2 is the Van't Hoff diagram of simple hydrides using the calculated values of $\Delta E_{hyd}$.

FIG. 2 represents the translation of these values to the Van't Hoff diagram by using the calculated values of $\Delta E_{hyd}$. As is known experimentally, none of the simple hydrides of Table 1 (except for BeH$_2$, which exhibits other difficulties of operation) makes it possible to come close to the target window that is defined above, which makes it possible to consider the use of these materials for storing hydrogen.

For example, the case of magnesium hydride, which is used as a reference to the following, reveals that $\Delta H_{hyd}(MgH_2)$ is equal to −75.0 kJ per mol of H$_2$ (see references [2] and [3] above). The calculation provides a very close value, on the order of −70.2 kJ per mol of H$_2$. The equilibrium temperature at atmospheric pressure is 575 K experimentally (see reference [2]), which is much too high to be usable.

Example 2

(For Comparison): Cases of Hydrides of Alloys with a Magnesium Base $Mg_xMH_n$ where M is a Transition Metal of the Ni, Fe or Ru Type So as to modify the thermodynamic properties of the reference magnesium hydride, it may be considered to add to it a second element that can be considered to be a "thermodynamic dopant" of the magnesium hydride system. In practice, the formation of an alloy of type $Mg_xM$ is sought. An element that is often proposed in the literature is nickel, which constitutes the Mg$_2$Ni alloy phase. In this case, the formation reaction of the hydride from the alloy is written:

$$\tfrac{1}{2}Mg_2Ni + H_2 \rightarrow \tfrac{1}{2}Mg_2NiH_4 \quad (7)$$

Experimentally, the hydrogenation enthalpy of the alloy $\Delta H_{hyd}$ is equal to −64.5 kJ per mol. The quantum calculation, according to the process defined above, leads to a very compatible value of $\Delta E_{hyd}$, equal to −66.7 kJ per mol of H$_2$. This value includes the calculation of the electronic energy of the two phases Mg$_2$Ni and Mg$_2$NiH$_4$, whose structures that are obtained from the CRYSMET base are recorded in Tables 2 and 3.

TABLE 2

Structural Properties and Mass Capacity of Mg$_x$MH$_n$-Type Hydrides with M = Ni

| Hydride | Crystallographic Reference | Space Group | % by Mass | Balance Equation |
|---|---|---|---|---|
| Mg$_2$NiH$_4$ | CRYSMET.865285 | C2/c | 3.59 | 1/2Mg$_2$Ni + H$_2$ → 1/2NiMg$_2$H$_4$ |

TABLE 3

Structural Properties of Alloys of Mg$_x$M Type with M = Ni

| Formula | Crystallographic Reference | Space Group |
|---|---|---|
| Mg$_2$Ni | CRYSMET.24598 | P6222 |

From the methodological standpoint, this result first of all confirms that quantum descriptor $\Delta E_{hyd}$ is suitable for the exploration of the most complex hydride phases such as the alloy hydrides.

From the application standpoint, the known consequence is that the nickel proves to be only a modest thermodynamic dopant. For a high Ni/Mg atomic ratio (equal to ⅓ in Mg$_2$NiH$_4$), a slight increase of $\Delta H_{hyd}$ is observed: +10 kJ per mol of H$_2$ (+3.5 kJ per mol of H$_2$ for the value of $\Delta E_{hyd}$). This results in a minor effect on the temperature of the isothermal plateau at atmospheric pressure: it remains on the order of 500 to 525 K (see reference [2] above, as well as: "A Panoramic Overview of Hydrogen Storage Alloys From A Gas Reaction Point of View," G. Sandrock, *Journal of Alloys and Compounds* 293-295 (1999) 877-888).

Consequently, there is not much chance of being able to improve the thermodynamic properties of the magnesium hydride thanks to the addition of nickel.

Two other hydrides of alloys that consist of the element magnesium and Fe or Ru have been simulated: they correspond to the structures that are recorded in Table 4 below.

TABLE 4

Structural Properties and Mass Capacity of Hydrides of Mg$_x$MH$_n$ Type with M = Ru or Fe

| Hydride | Crystallographic Reference | Space Group | % by Mass | Balance Equation |
|---|---|---|---|---|
| Mg$_2$RuH$_6$ | CRYSMET.58330 | Fm-3m | 3.85 | 1/6Mg$_3$Ru$_2$ + 1/6Mg + H$_2$ → 1/3RuMg$_2$H$_6$ |
| Mg$_2$FeH$_6$ | Isomorphic with Mg$_2$RuH$_6$ | Fm-3m | 5.43 | 1/3Fe + 2/3Mg + H$_2$ → 1/3FeMg$_2$H$_6$ |

The structures of alloys (when they exist) corresponding to the hydrides of Table 4 are provided in Table 5. At this time, no stable Mg—Fe alloy structure is known in the Mg—Fe thermodynamic phase diagrams (see: O. Kubaschewski "Fe—Mg; Iron-Magnesium"; pp. 59-60 of the volume "Iron-Binary Phase Diagrams"; Springer-Verlag, 1982). This justifies the fact that the elements Fe and Mg were considered in the balance equation of Table 2. For the hydride structure of Mg—Fe, we considered the homolog to Mg$_2$RuH$_6$, referenced in the CRYSMET base. This selection is justified in part by the position of the Fe and the Ru located on the same column of the periodic table. Furthermore, the calculation of optimization of the structure by following the process that is described above shows that this structure is stable thermodynamically and that the value of $\Delta E_{hyd}$ is equal to −94.4 kJ per mol of H$_2$.

TABLE 5

Structural Properties of the Mg$_x$M-Type Alloys with M = Ru

| Formula | Crystallographic Reference | Space Group |
|---|---|---|
| Mg$_3$Ru$_2$ | CRYSMET.27192 | P4132 |

Figure 3:
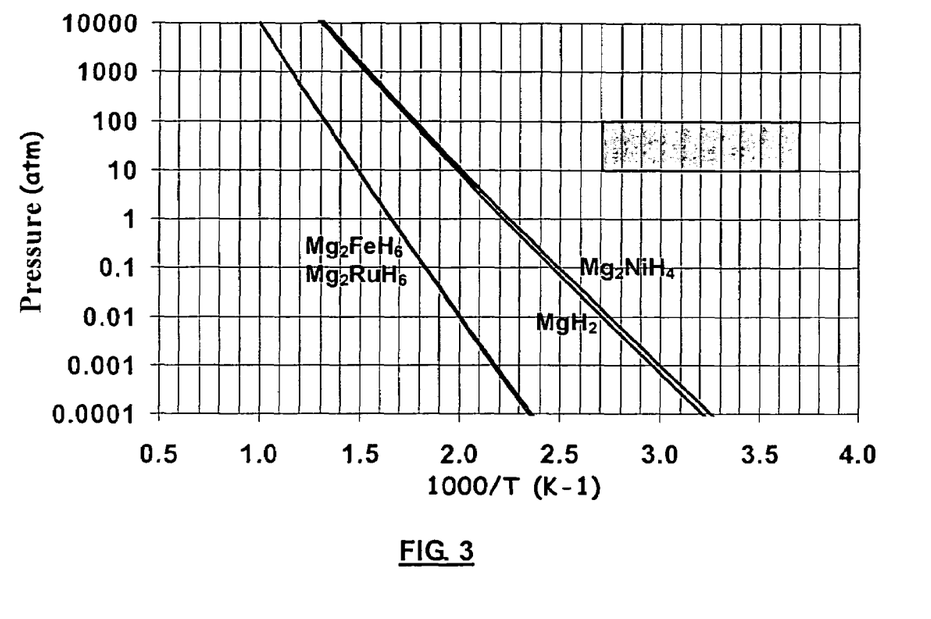
FIG. 3 is the plot of Van't Hoff curves for the $Mg_xMH_n$-type hydrides with M=Fe, Ru or Ni.

The plot of Van't Hoff curves (FIG. 3) in the case of these materials proves that neither iron nor ruthenium is likely to be a thermodynamic dopant of the magnesium system. Due to values of $\Delta E_{hyd}$ equal to −94.4 kJ per mol of H$_2$ for Fe, and −95.2 kJ per mol of H$_2$ for Ru, the two hydrides are located on the almost merged Van't Hoff lines and deviate from the target zone for the applications relative to the pure magnesium hydride. In the case of Mg$_2$FeH$_6$, our simulation is in agreement with the results published recently and reveals a negative effect of Fe on the thermodynamic properties of the initial magnesium hydride (see: "Materials for Hydrogen Storage"; Andreas Züttel, *Materials Today* 6 (2003) 24-33).

None of these materials therefore offers any advantage for storage.

Example 3

Case of M$_x$PdH$_n$ Hydride

The case that is explored in this example according to the invention relates to the hydride of metal alloys that consist of magnesium and palladium elements. There are no known crystallographic structures (referenced in the crystallographic bases) for a hydride of Mg$_2$PdH$_4$ type (analog of Mg$_2$NiH$_4$). Analogously to the Mg—Ni—H system, we therefore constructed the structure of this hydride by taking into consideration an isomorphic structure with Mg$_2$NiH$_4$ of the same space group C2/c as the stable structure of Mg$_2$NiH$_4$, referenced CRYSMET.865285.

The substitution of nickel by palladium requires optimization of atomic positions as well as parameters of the cell according to the simulation process described above. The result of this optimization leads to the definition of the structure for Mg$_2$PdH$_4$ provided in Table 6 and whose DRX spectrum is provided in FIG. 4.

TABLE 6

Definition of the Mg$_2$PdH$_4$Mesh

| Space Group | C2/c | | |
|---|---|---|---|
| Parameters of the Monoclinical Cell | a = 15.03310 | b = 6.55584 | c = 6.71647 |
| | α = 90.00 | β = 113.77 | γ = 90.00 |
| Element | X | Y | Z |
| Pd (8f) | 0.12162 | 0.27220 | 0.07139 |

TABLE 6-continued

Definition of the Mg$_2$PdH$_4$Mesh

| Space Group | C2/c | | |
|---|---|---|---|
| Mg (8f) | 0.26519 | 0.00562 | 0.08072 |
| Mg (4e) | 0.00000 | 0.46188 | 0.25000 |
| Mg (4e) | 0.00000 | −0.02846 | 0.25000 |
| H (8f) | 0.22136 | 0.20452 | 0.30980 |
| H (8f) | 0.13871 | −0.13907 | 0.36936 |
| H (8f) | 0.00945 | 0.20110 | 0.06685 |
| H (8f) | 0.12291 | 0.46990 | 0.55214 |

Relative to the Mg—Pd alloys, there are several crystallographic phases and structures inventoried in the literature (see: A. A. Nayeb-Hashemi, J. B. Clark "The Mg—Pd (Magnesium-Palladium) System," *Bull. Alloy Phase Diagrams* 6(2) (1985) 164-167). These structures are recorded in Table 7. Four phases have well-defined structures: MgPd, Mg$_5$Pd$_2$, Mg$_3$Pd and Mg$_{6.08}$Pd. These are the ones that we used for the calculations of $\Delta E_{hyd}$.

TABLE 7

Structural Properties of the Mg$_x$Pd-Type Alloys.

| Formula | x | Crystallographic Reference | Space Group |
|---|---|---|---|
| MgPd | 1 | CsCl CRYSMET.31642 Prototype | Pm-3m |
| Mg$_5$Pd$_2$ | 2.5 | Co$_2$Al$_5$ ICSD.30207 Prototype | P63/mmc |
| Mg$_3$Pd | 3 | Isomorphic AsNa$_3$ CRYSMET.85519 | P63/mmc |
| Mg$_4$Pd | 4 | Not Resolved | Unknown |
| Mg$_{6.08}$Pd | 6.08 | ICSD.2750 | F4-3m |

Figure 5:
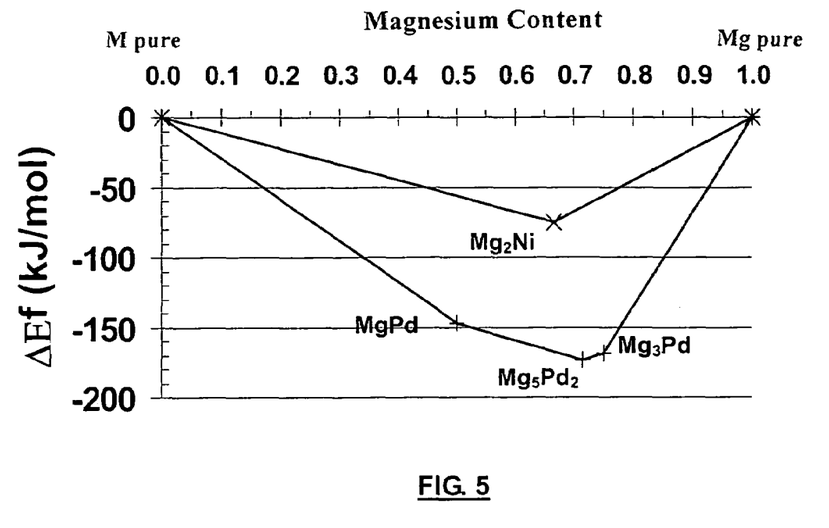
FIG. 5 represents formation energy $\Delta E_{hyd}$ of the $Mg_xPd$ alloys based on their composition.

The DFT simulations initially make it possible to verify the stability of alloys thanks to the plot of the diagram of FIG. 5 based on the composition of the alloys. This diagram expresses the energy of formation of alloys, $\Delta E_f$, calculated relative to the elements. $\Delta E_f$ is calculated analogously to $\Delta E_{hyd}$ in the absence of hydrogen. It reveals in particular that the energy of formation of Mg—Pd alloys is significantly higher than that of the Mg$_2$Ni alloy. This result will have a quantitative result on the value of $\Delta E_{hyd}$ corresponding to the hydrogenation transformations.

The stability of the new Mg$_2$PdH$_4$ hydride structure relative to the metallic elements (Mg or Pd) is tested thanks to the following balance:

$$Pd + 2Mg + 2H_2 \rightarrow Mg_2PdH_4 \quad (8)$$

The calculated value of the energy variation $\Delta E_{hyd}$ of this reaction is −100.3 kJ per mol of hydrogen. This energy value, comparable to that for Mg$_2$NiH$_4$ (−104.17 kJ per mol of hydrogen), confirms the thermodynamic stability of Mg$_2$PdH$_4$ with regard to its elements.

The possible segregation of Pd away from the Mg$_2$PdH$_4$ phase can be expressed thanks to the following chemical balance:

$$Mg_2PdH_4 \rightarrow Pd + 2MgH_2 \quad (9)$$

The calculated value of the energy balance of (9) is +60.3 kJ per mol of palladium, which shows that this segregation is not possible and that the Mg$_2$PdH$_4$ structure is thermodynamically stabilized relative to the magnesium hydride and the metallic palladium.

The determination of new thermodynamic properties of the Mg$_2$PdH$_4$ hydride for the purpose of use for the storage of hydrogen requires the quantum calculation of $\Delta E_{hyd}$ according to the previously established process. According to the final composition of the hydride phase and in particular according to the mass percentage of stored theoretical hydrogen, the thermodynamic properties are modified. Tables 8 and 9 show the variations of $\Delta E_{hyd}$ based on the mass percent of stored hydrogen.

TABLE 8

Chemical Equations of the Hydrogenation of the Mg—Pd System and x-Based Mass Storage Capacity

| Mg$_x$Pd | % by Mass | Chemical Equations | $\Delta E_{hyd}$ (kJ/mol of H$_2$) |
|---|---|---|---|
| x = 1 | 2.52 | $\frac{1}{2}MgPd + \frac{1}{2}Mg + H_2 \rightarrow \frac{1}{2}Mg_2PdH_4$ | −26.6 |
| x = 2.5 | 3.12 | $\frac{1}{5}Mg_5Pd_2 + H_2 \rightarrow \frac{2}{5}Mg_2PdH_4 + \frac{1}{5}MgH_2$ | −24.8 |
| x = 3 | 3.24 | $\frac{1}{3}Mg_3Pd + H_2 \rightarrow \frac{1}{3}Mg_2PdH_4 + \frac{1}{3}MgH_2$ | −34.0 |
| x ≧ 7 | % (x) | $\frac{1}{x}Mg_3Pd + \left(1 - \frac{3}{x}\right)Mg + H_2 \rightarrow$ $\frac{1}{x}Mg_2PdH_4 + \left(1 - \frac{2}{x}\right)MgH_2 (*)$ | $\Delta E_{hyd}(x)$ |

(*) General formula used for x ≧ 7, in the case where the Mg$_x$Pd alloy does not exist and by taking into consideration an Mg$_3$Pd and Mg mixture. (This formula is also valid for x ≧ 3).

TABLE 9

Content by Mass And Hydrogenation Enthalpy for an x-Based Mg$_3$Pd and Mg Mixture

| x | % by Mass | $\Delta E_{hyd}$ (kJ/mol of H$_2$) |
|---|---|---|
| 7 | 4.82 | −54.6 |
| 8 | 5.05 | −56.5 |
| 9 | 5.24 | −58.1 |

Figure 6:
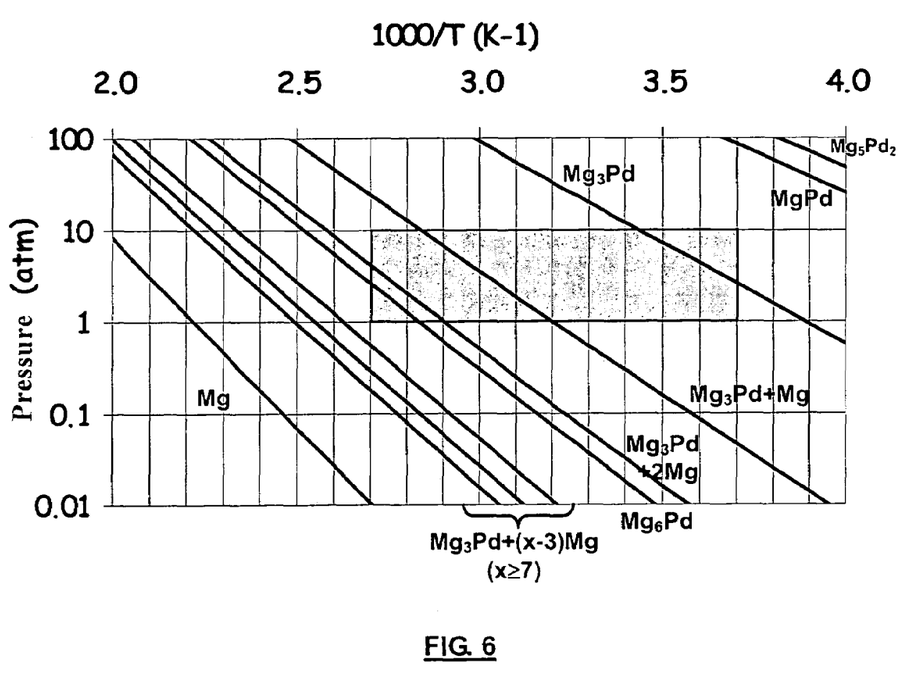
FIG. 6 is the plot of the Van't Hoff lines corresponding to the hydrogenation of the Mg—Pd alloys.

FIG. 6 shows the Van't Hoff lines that correspond to the hydrogenation of Mg—Pd alloys for the different cases envisaged in Tables 8 and 9.

This diagram clearly reveals that the palladium plays the role of thermodynamic dopant for magnesium hydride. The Van't Hoff lines that correspond to the equilibria for x=1 and 2.5 essentially move the thermodynamic properties of the system away from the target window. The cases corresponding to equilibria (x=3 to 6) pass through the target zone in terms of pressure and temperature [see equations (6)] embodying a possible field of application of this system for the storage of hydrogen. The cases x=7, 8 or 9 also can be retained from the thermodynamic standpoint. Under these conditions, the mass storage capacity for values (x=3 to 9) is high and encompassed between 3.24% and 5.24%. We therefore found potentially usable systems for the storage of hydrogen.

The storage of hydrogen under these favorable thermodynamic conditions is therefore linked to the hydrogenation reaction of the Mg—Pd alloys of hydride containing the found structure Mg$_2$PdH$_4$, defined above.

Example 4

MgPd alloy powders were developed and compared to a commercial powder of pure magnesium.

The development of the $Mg_6Pd$ alloy was done by melting suitable amounts of magnesium and palladium in a crucible. Induction heating is applied, and a pyrometer makes it possible to follow the temperature during the melting of the alloy.

So as to obtain the $Mg_6Pd$ composition, 8.4323 g of Pd was melted with 11.5588 g of Mg (mass percent of palladium of 42.18%).

The thus obtained alloy was then ground in a planetary mixer so as to obtain an $Mg_6Pd$ nanopowder with a grain size of about 50 nm.

A characterization of the powder by X-diffraction is then carried out: the diffraction peaks correspond to the reference ICSD.2750 (space group F4-3M).

The thermogravimetry under pressure is used to characterize the properties of hydrogen storage and to measure the kinetic and thermodynamic properties of hydrogenation and the dehydrogenation of powders of commercial magnesium and $Mg_6Pd$ magnesium-palladium alloy developed as indicated above. The thermobalance that is used has a magnetic suspension that makes it possible to operate between 1 and 100 bar of hydrogen and for temperatures of 20 to 1100° C. with a resolution of 1 µg.

This characterization is carried out at 200° C. under 0.5 MPa of hydrogen.

TABLE 10

| Powder | % by Mass of H Stored at the End of 72 Hours |
| --- | --- |
| Pure Commercial Mg | 0 |
| $Mg_6Pd$ | >2.1 |

These results clearly indicate that the palladium plays the role of dopant.

Figure 7:
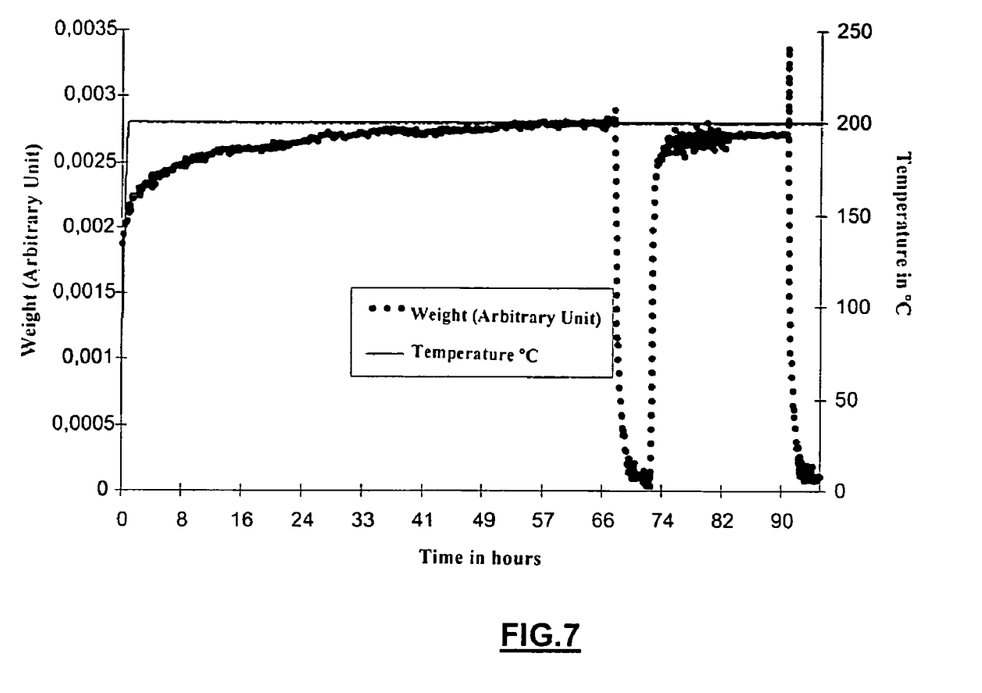
FIG. 7 represents an absorption-desorption cycle on $Mg_6Pd$ at 100° C.

Absorption cycles (under 0.5 MPa of hydrogen)—desorption of hydrogen were also carried out at 200° C. As FIG. 7 indicates, a very good reversibility is obtained with this magnesium-palladium alloy.

The entire disclosures of all applications, patents and publications, cited herein and of corresponding French application No. 05/01.229, filed Feb. 7, 2005 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for reversible storage of hydrogen in a crystalline material, said process comprising bringing an alloy comprising magnesium and palladium into contact with gaseous hydrogen leading to the formation of hydride or corresponding hydrides, according to a balanced system corresponding to the formula:

$$Mg_x Pd \Leftrightarrow Mg_x PdH_n$$

in which atomic ratio x takes on a value of 3 to 6, and n is the number of hydrogen atoms corresponding to the stoichiometry of the hydride or hydrides formed.

2. A process for reversible storage of hydrogen in a crystalline material, said process comprising bringing an alloy comprising magnesium and palladium into contact with gaseous hydrogen leading to the formation of a mixture containing the $Mg_2PdH_4$ hydride phase and other corresponding hydrides, according to a balanced system corresponding to the formula:

$$Mg_x Pd \Leftrightarrow Mg_2PdH_4 + Mg_{x-2}H_n$$

in which the atomic ratio x takes on a value of 7 to 9, and n is the number of hydrogen atoms corresponding to the stoichiometry of the hydride or formed hydrides.

3. A process according to claim 1, wherein said alloy contains, in a proportion that is less than 5% by weight, at least the element N or a transition metal of groups 3 to 12 of the periodic table selected from the group consisting of Sc, Ti, V, Cr, Mn, Fe, Co, Ni, Cu and Zn.

4. A process according to claim 1, wherein said alloy comprising magnesium and palladium is in solid form.

5. A process according to claim 1, wherein said alloy comprising magnesium and palladium is in dispersed form.

6. A process according to claim 5, wherein the dispersed form of said alloy of magnesium and palladium is obtained by grinding.

7. A process according to claim 1, wherein said process provides for the storage of on-board hydrogen.

8. A process according to claim 1, wherein said process provides for the stationary storage of hydrogen.

9. A process according to claim 1, wherein said process provides for the portable storage of hydrogen.

10. A new crystalline structure corresponding to formula $Mg_2PdH_4$ and belonging to space group C2/c.

11. A process according to claim 2, wherein said alloy contains in a proportion that is less than 5% by weight, at least the element N or a transition metal of groups 3 to 12 of the periodic table selected from the group consisting of Sc, Ti, V, Cr, Mn, Fe, Co, Ni, Cu and Zn.

12. A process according to claim 2, wherein said alloy comprising magnesium and palladium is in solid form.

13. A process according to claim 2, wherein said alloy comprising magnesium and palladium is in dispersed form.

14. A process according to claim 13, wherein the dispersed form of said the alloy of magnesium and palladium is obtained by grinding.

15. A process according to claim 2, wherein said process provides for the storage of on-board hydrogen.

16. A process according to claim 2, wherein said process provides for the stationary storage of hydrogen.

17. A process according to claim 2, wherein said process provides for the portable storage of hydrogen.

18. A process according to claim 1, wherein said alloy consists of magnesium, palladium and less than 5% by weight of element N or a transition metal selected from Sc, Ti, V, Cr, Mn, Fe, Co, Ni, Cu and Zn.

19. A process according to claim 2, wherein said alloy consists of magnesium, palladium and less than 5% by weight of element N or a transition metal selected from Sc, Ti, V, Cr, Mn, Fe, Co, Ni, Cu and Zn.

* * * * *